D. R. JENKINS.
CONVERTIBLE OPEN AND CLOSED VEHICLE TOP.
APPLICATION FILED MAY 24, 1920.
1,407,278.
Patented Feb. 21, 1922.
2 SHEETS—SHEET 1.
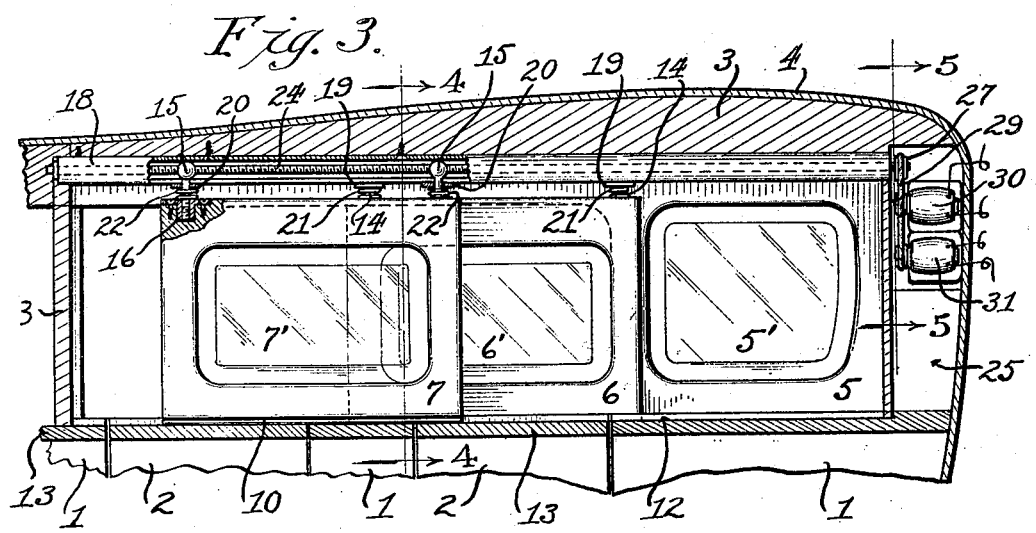
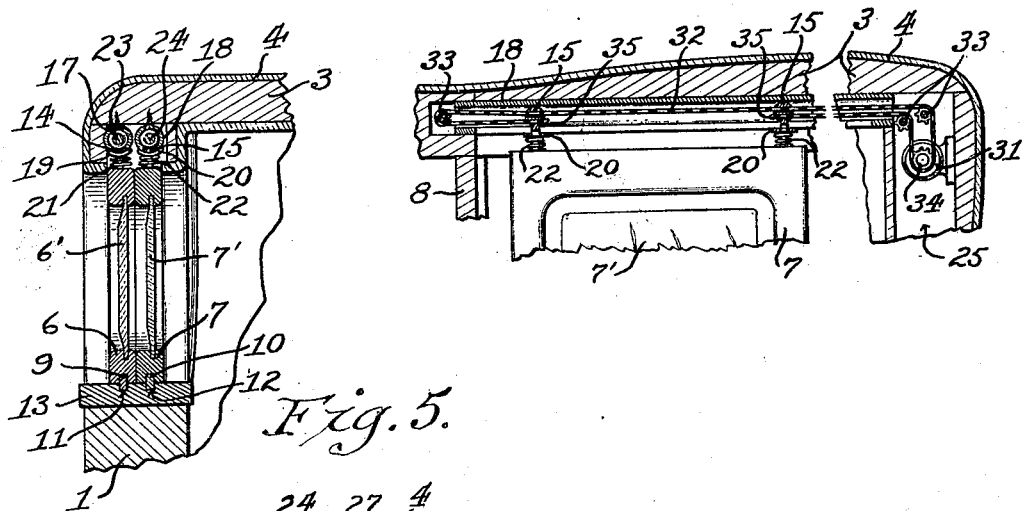
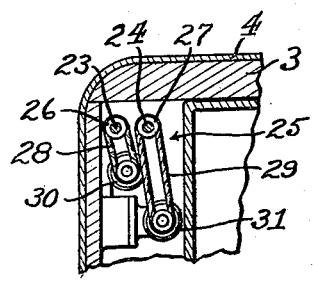
INVENTOR.
David R. Jenkins,
BY Booth & Booth
ATTORNEYS.

D. R. JENKINS.
CONVERTIBLE OPEN AND CLOSED VEHICLE TOP.
APPLICATION FILED MAY 24, 1920.

1,407,278.

Patented Feb. 21, 1922.
2 SHEETS—SHEET 2.

INVENTOR.
David R. Jenkins.
BY Booth & Booth,
ATTORNEYS.

UNITED STATES PATENT OFFICE.

DAVID R. JENKINS, OF OAKLAND, CALIFORNIA.

CONVERTIBLE OPEN AND CLOSED VEHICLE TOP.

1,407,278.  Specification of Letters Patent.  Patented Feb. 21, 1922.

Application filed May 24, 1920. Serial No. 383,609.

*To all whom it may concern:*

Be it known that I, DAVID R. JENKINS, a citizen of the United States, residing at Oakland, in the county of Alameda and State of California, have invented certain new and useful Improvements in Convertible Open and Closed Vehicle Tops, of which the following is a specification.

My invention relates to vehicle tops of that type in which movable windows are used for closing the space between the top and the body of the vehicle. It is especially adapted for automobile tops, but may be used equally as well upon other vehicles.

The objects of my invention are to provide such a top in which the movable windows are rigid in construction, to enable the use of glass panes therein, and to provide mechanism by which said windows may be operated automatically, to open or closed positions, said automatic operating mechanism being conveniently and easily controlled by the occupant of the vehicle. In the preferred forms of my invention, as herewith illustrated and hereinafter described, I employ electric motors for moving the windows, for the reason that electric power is the simplest from the standpoint of construction, and can be most easily controlled, but it is to be understood that other forms of power may be used for this purpose.

A further object of my invention is to provide movable windows which are sufficiently free to be capable of easy operation, but which will not rattle or vibrate in their mountings. The use of glass panes in windows of the type described is highly desirable, as opposed to flexible celluloid panes, not only for their superior appearance, but also on account of their perfect clearness, and long life. Celluloid, as is well known, is not only less pleasing to look through than glass, but deteriorates rapidly, and soon becomes brittle. But difficulty has been encountered in making movable glass windows sufficiently tight to prevent unpleasant rattling. By the construction embodying my invention, however, I am enabled to make freely movable glass windows which will not rattle even after long use.

These and other objects of my invention will be made more apparent in the following specification. It is to be understood, however, that my invention may be embodied in forms other than those described and illustrated, and that changes in the construction of the device may be made, within the scope of the claim hereto appended, without departing from the spirit of the invention.

With this in view, my invention will now be fully described with reference to the accompanying drawings, wherein—

Fig. 3 is a vertical section, enlarged, taken in the direction of the arrows on the line 3—3 of Fig. 2.

Figure 1:
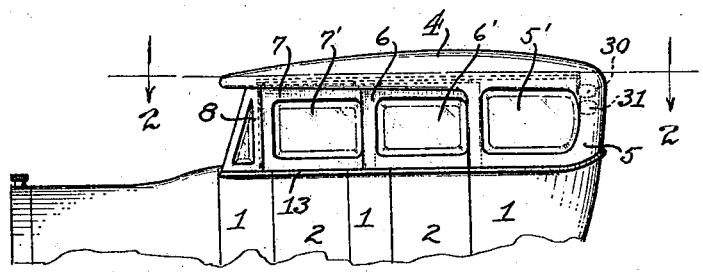
Fig. 1 is a side elevation of my top as applied to an automobile.

Figs. 4 and 5 are fragmental vertical sections taken respectively on the lines 4—4 and 5—5 of Fig. 3 and viewed in the direction of the arrows.

Fig. 6 is a broken vertical section showing a modified form of mechanism for operating the movable windows.

In the drawings, the reference numeral 1 designates the body of a vehicle, shown as an automobile for purposes of illustration, 2 are the usual doors of said body, 3 is the frame of a top, and 4 the covering thereof. In the drawings I have shown said top as rigid and permanently connected with the body 1, but it is to be understood that any form of top, either permanent or removable, may be used, the form shown being merely an example.

The space between the body 1 and the top 4 is enclosed at the rear portions of the sides, by permanently positioned windows 5, Figs. 1 and 3, having glass panes 5'. Forward of these fixed windows 5 are two movable windows 6 and 7 on each side, containing glass panes 6' and 7' respectively. Said movable windows, when in the position shown in Fig. 1, completely close the space between the rear windows 5 and the front supports 8 of the top, and are adapted to open by sliding rearward into positions inside of and in transverse alignment with the rear windows 5.

The movable windows 6 and 7 are provided, on their lower edges, with tongues 9 and 10 respectively, Fig. 4, which slide in grooves 11 and 12 formed in a sill or molding 13 secured to the upper edges of the body 1 and the doors 2, said grooves extending continuously across said doors, as shown in Fig. 3. At their upper edges said windows are respectively provided with hangers 14 and 15, Fig. 3, there being preferably two such hangers for each window. Each of said hangers consists of a shank portion which is preferably secured to the window by means of a socket member, one of which is shown at 16, and a ball-head adapted to travel in a longitudinally disposed slotted tubular guide mounted in the top frame 3 and extending the entire length of said top. There are two such guides on each side, disposed parallel and adjacent to each other, as shown at 17 and 18 in Fig. 4, the guide 17 serving as a track or runway for the hangers 14 of the window 6, and the guide 18 serving similarly for the hangers 15 of the window 7.

To prevent rattling, the shanks of the hangers 14 and 15 are provided with freely fitting apertured plates 19 and 20 respectively, Figs. 3 and 4, which are pressed upwardly and caused to bear against the undersides of the tubular guides 17 and 18 by springs 21 and 22. Said springs thus serve to press the windows down firmly against their lower guides 11 and 12.

Concentrically located within the tubular guides 17 and 18 are rotatable screws 23 and 24 respectively. Only the guide 18 and its screw 24 are shown in Fig. 3, the guide 17 lying behind said guide 18. Both guides and their respective screws appear in Fig. 4 however. Said screws 23 and 24 pass through the ball-heads of the respective hangers 14 and 15, and have threaded engagement therewith, so that rotation of said screws causes linear movement of said hangers within their respective guides. The screw 23 therefore operates the window 6, causing it to slide forward or rearward, depending upon the direction of rotation of said screw, and the screw 24 similarly operates the window 7.

Figure 2:
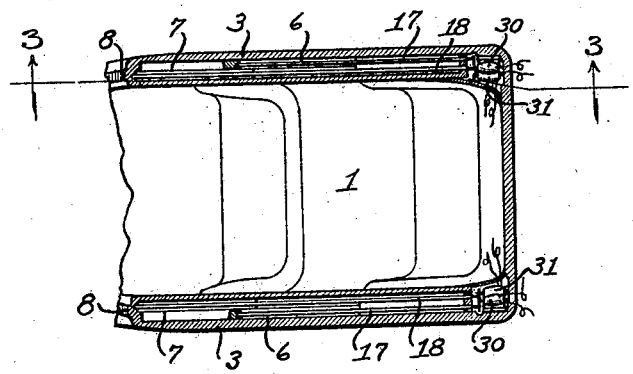
Fig. 2 is a broken sectional plan taken on the line 2—2 of Fig. 1.

The screws 23 and 24 project beyond the rear ends of the respective guides 17 and 18 into a chamber 25 formed at the rear of the top as shown in Figs. 2, 3 and 5, and said projecting ends are provided with pulleys 26 and 27, Fig 5, which are connected, by means of belts 28 and 29, with suitable separate sources of motive power 30 and 31 respectively, here shown as electric motors. Said motors may be connected in any desired manner with a suitable source of electric power and suitable controlling and reversing switches, which form no part of the present invention and are therefore not shown in the drawings. Thus by supplying current to the motor 30, the window 6 may be opened or closed at will, and by means of the motor 31 the window 7 may be similarly operated.

In Fig. 6 of the drawings I have shown a modification of the device described above. In said Fig. 6 but one window, 7, is shown, it being typical of all. The screw 24 of the previously described form is replaced by a sprocket chain 32, which extends through the slotted tubular guide 18, and passes over idler sprockets 33 and a driving sprocket 34 mounted on the shaft of the motor 31. The ends of the chain 32 are secured to the ball-heads of the hangers 15, as shown at 35, and the central portion, or return run of said chain passes freely through said ball-heads, so that by the operation of the motor 31, the window 7 is moved either forward or rearward, according to the direction of rotation of said motor.

I claim:—

In a vehicle having a top and a body in spaced relation; a window fitted in said space with its lower edge slidably mounted on the body; a hollow guide in the top having a longitudinal slot in its bottom; hangers connected with the top of the window, said hangers slidably fitted in the slot of the guide and having heads within said guide; plates freely fitted on the hangers and slidably bearing under the guide; springs around said hangers between the plates and the top of the window to hold the window snug; and a power transmitting member housed within the guide and connected with the heads of the hangers to slide said hangers and open and close the window.

In testimony whereof I have signed my name to this specification.

DAVID R. JENKINS.